United States Patent [19]
Chang

[11] Patent Number: 6,081,967
[45] Date of Patent: Jul. 4, 2000

[54] OPERATING DEVICE FOR A TELESCOPIC HANDLE OF A LUGGAGE CART

[76] Inventor: Fu-Jung Chang, 8-5 Fl., No. 191, Fu Hsing N. Rd, Taipei, Taiwan

[21] Appl. No.: 09/273,851

[22] Filed: Mar. 22, 1999

[51] Int. Cl.[7] .................................. A45C 3/00; A45F 5/10
[52] U.S. Cl. ............................................ 16/113.1; 280/655
[58] Field of Search .................................. 16/113.1, 405, 16/429; 280/47.371, 47.315, 655, 655.1; 190/14, 15 R, 18 A, 18 R, 115

[56] References Cited

U.S. PATENT DOCUMENTS

| 5,379,486 | 1/1995 | Wang ...................................... | 16/113.1 |
| 5,647,095 | 7/1997 | Chang ..................................... | 16/113.1 |
| 5,669,103 | 9/1997 | Hui ......................................... | 16/113.1 |
| 5,732,443 | 3/1998 | Kazmark, Jr. et al. ................. | 16/113.1 |

*Primary Examiner*—Chuck Y. Mah
*Attorney, Agent, or Firm*—Heller Ehrman White & McAuliffe LLP

[57] ABSTRACT

The present invention relates to a operating device for a telescopic handle of a luggage cart. The handle includes a transverse bar defining an internal chamber therein and an aperture on the right top end, a pair of telescopic tubes with their top ends respectively fixed to opposite ends of the transverse bar. A pair of linkages are respectively and movably received in the internal chamber. Each one of the linkages moves in reversed orientation, such that a pivotal movement is initiated to cause an upward and a downward movement simultaneously while the operating device is activated. The movement of the operating device in reversed orientation will accomplish the extending or folding of the tubes.

5 Claims, 5 Drawing Sheets

OPERATING DEVICE FOR A TELESCOPIC HANDLE OF A LUGGAGE CART

BACKGROUND OF THE INVENTION

1. Field of the Invention

The present invention relates to an operating device for the telescopic handle of a luggage cart, and more particularly to an operating device able to initiate a reverse operation to a pair of operating blocks so as to simultaneously control both sides of the handle of the luggage cart.

2. Description of Related Art

Luggage carts are generally carried by people on travel, and are normally provided with a telescopic handle and wheels so as to facilitate transportation of luggage on the ground. Numeral luggage carts have long been introduced to the market. Examples of this cart are as followings: U.S. Pat. Nos. 5,400,472; 5,553,350; 5,367,743 and 5,371,923.

The telescopic handle typically comprises a transverse bar and a pair of telescopic tubes. Particularly, a lock control device provided in the tubes comprises a control button provided on the bottom of the transverse bar. The control button is synchronously controls both side telescopic tubes. However, the disadvantage of the control button provided under the transverse bar is that a user inadvertently presses the button with his/her fingers when grasping the transverse bar.

To rectify the above defect, the manufacturer introduced a handle with two unilateral buttons respectively installed on opposite ends of the telescopic tubes instead of the single control button. With this arrangement, a user must press both buttons to unlock both tubes. Failure to press both buttons before attempting to extend or collapse the tubes will cause the tubes to be extended out of phase and easily jam.

According to the above situation, an improvement of the lock control device is needed.

SUMMARY OF THE INVENTION

The main object of the present invention is to provide an operating device for a telescopic handle of a luggage cart. The operating device comprises a control button provided on one side of the handle, a transverse lever extending between opposite ends of the handle, two link bars respectively connected to one end of the lever, and a pair of operating blocks. When pressed by a user, the control button pushes down one end of the lever, which initiates a reversed upward operation on the other end of the lever. The operating blocks symmetrically provided on opposite sides of the handle are thus initiated by pivotal movement of the lever to allow the opposite sides of the handle to synchronously move.

A further object of the present invention is to provide an operating device for a telescopic handle of a luggage cart, which includes an operating button apart from the handle portion of the handle so that the user will not inadvertently press the button.

The detailed features of the present invention will be apparent in the detailed description with appropriate reference to the accompanying drawings.

DETAILED DESCRIPTION OF PREFERRED EMBODIMENT

Figure 1:
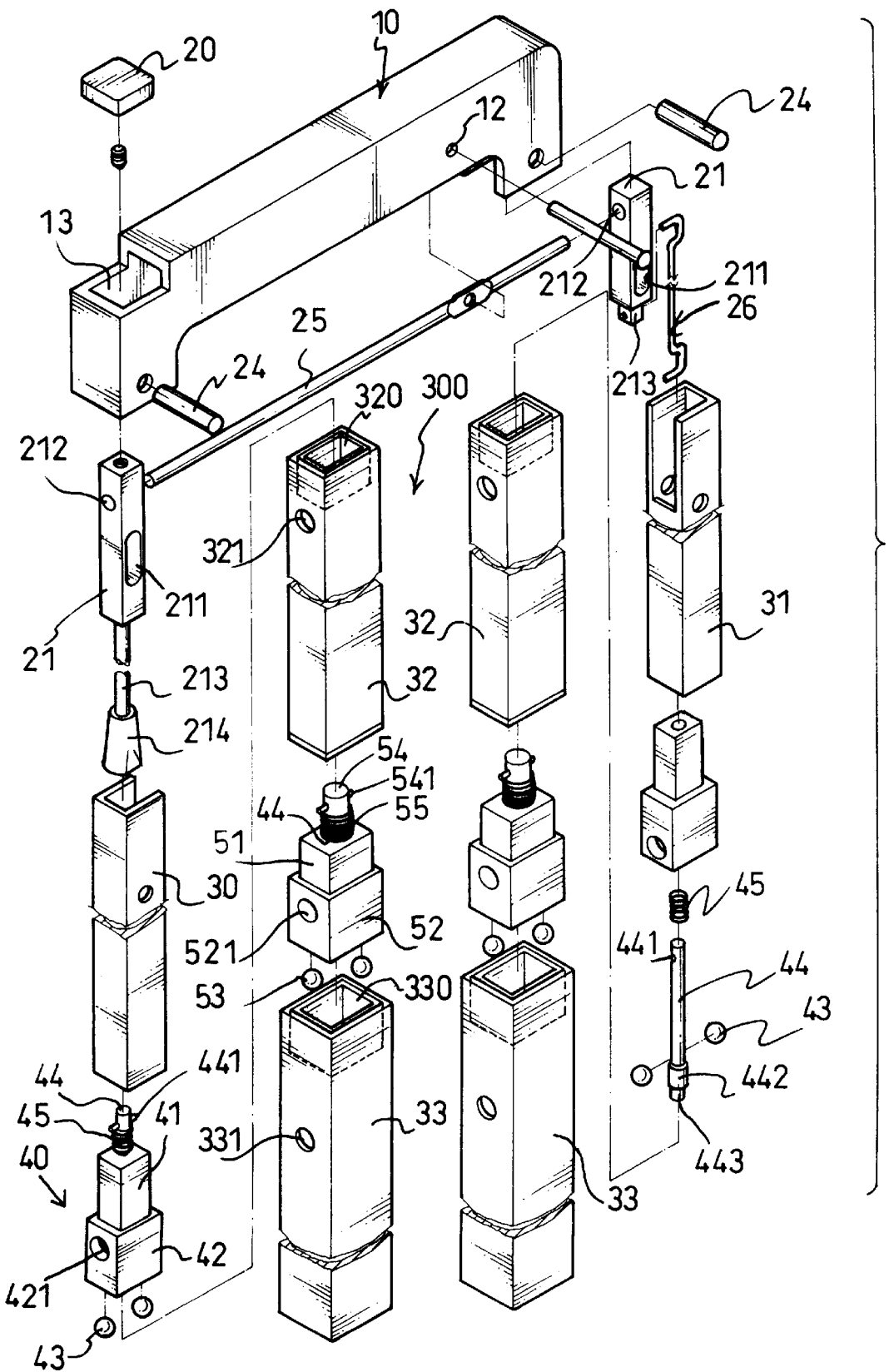
FIG. 1 is an exploded perspective view of the present invention.
Figure 2:
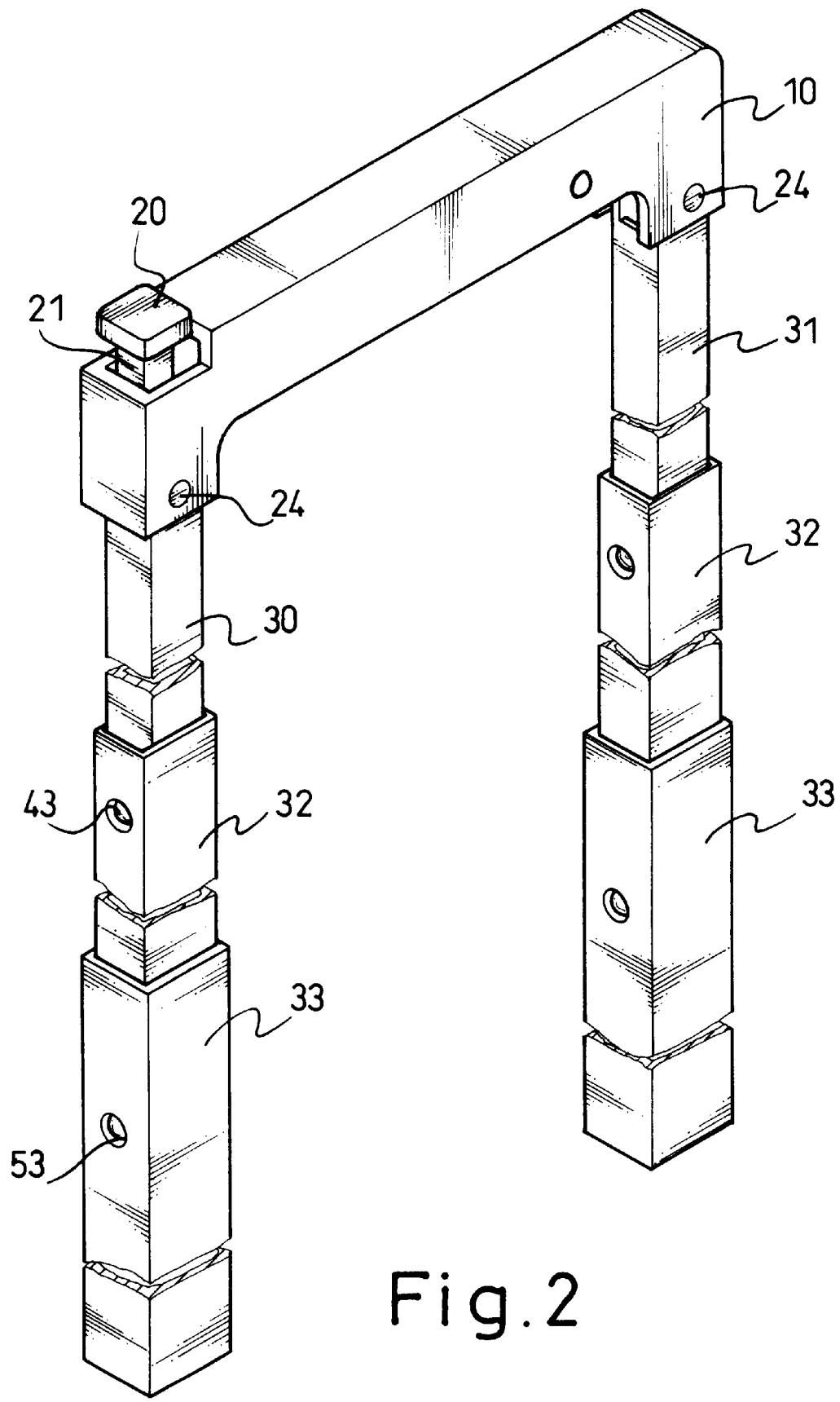
FIG. 2 is a perspective view of the present invention.
Figure 3:
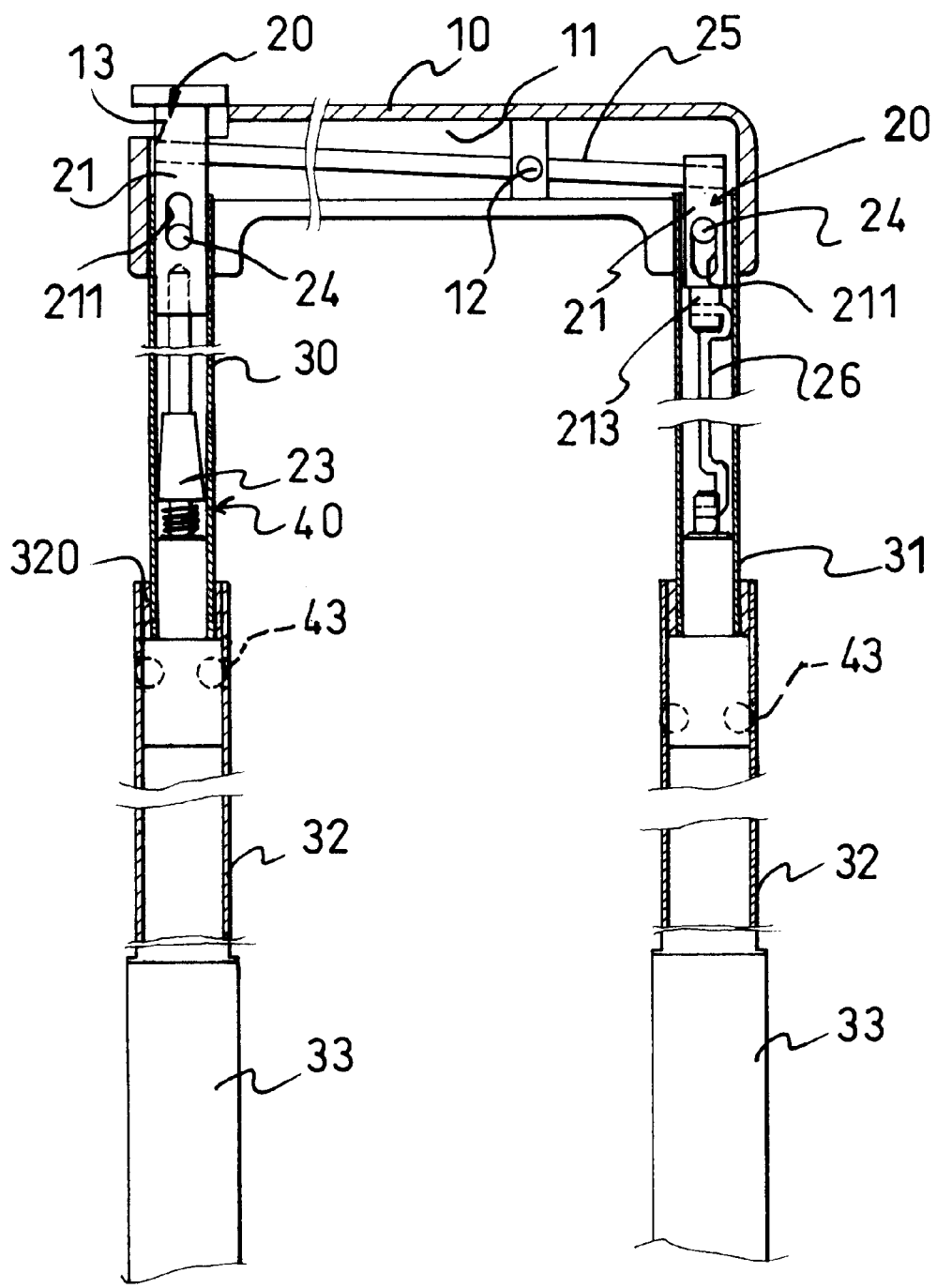
FIG. 3 is a schematic plan view in partial section showing the operating device of the present invention in assembly.

As shown in FIGS. 1, 2 and 3, a telescopic handle of a luggage cart constructed in accordance with the present invention comprises a transverse bar (10), a pair of telescopic tubes (300) with their top ends respectively attached to opposite ends of the transverse bar (10), and an operating device.

The transverse bar (10) has an internal chamber (11) defined therein, a pivot hole (12) defined to communicate with the internal chamber (11) and an aperture (13) defined at a corner thereof and to communicate with the internal chamber (11).

The telescopic tubes (300) symmetrically has two pairs of sets of tubes; each having an upper tube (30, 31) defining therein a cutout (not numbered), a middle tube (32) slidably receiving the upper tube (30, 31) therein and a lower tube (33) slidably receiving the middle tube (32) therein. Each one of the middle tubes (32) and the lower tubes (33) respectively have an inner padding (320, 330) securely provided at the distal end thereof. The inner padding (320), after being mounted in the middle tube (32), reduces the inner size of the middle tube (32) so as to prevent the upper tube (30, 31) from slipping out therefrom. The inner padding (330), after being mounted in the lower tube (33), reduces the inner size of the lower tube (33) so as to prevent the middle tube (32) from slipping out therefrom. The operating device of the invention is provided on both sides of the transverse bar (10) with only a slight difference therebetween. Therefore, a description of the left portion of FIG. 1 is provided. The operating device has a button (20) movably mounted on top of the aperture (13), a first linkage (21) securely connected to the button (20) within the internal chamber (11) of the transverse bar (10) with a hole (212) and a slot (211) longitudinally defined therein, an extension (213) extending downward therefrom and a cone (214) integrally formed on the free end of the extension (213), a first driven block (40) securely received in one end of the upper tube (30, 31) and a second driven block (50) securely received in one end of the middle tube (32). The first driven block (40) is hollow and has a first portion (41) securely inserted into the upper tube (30, 31), a second portion (42) larger in size than the first portion (41) integrally formed with the first portion (41) and a pair of balls (43) movably received in the second portion (42). The first driven block (40) further has a rod (44) longitudinally and movably received therein, a coil spring (45) mounted around the rod (44) and a stop (441) inserted through the rod (44) to hold the coil spring (45) in position between the first portion (41) and the stop (441). The first end of the rod (44) engages with the bottom of the cone (214). The second driven block (50) is hollow and has a first portion (51) securely inserted into the middle tube (32), a second portion (52) larger in size than the first portion (51) integrally formed with the first portion (51) and a pair of balls (53) movably received in the second portion (52). The second driven block (50) further has a rod (54) longitudinally and movably received therein, a coil spring (55) mounted around the rod (54) and a stop (541) inserted through the rod (54) to hold the coil spring (55) in position between the first portion (51) and the stop (541). The top end of the rod (54) is detachably connected to the second end of the rod (44). The sizes of the second portions (42, 52) of the first driven block (40) and the second driven block (50) are the same as that of the upper tube (30, 31) and the middle tube (32), such that after the first portions (41, 51) of the first driven block (40) and the second driven block (50) are respectively inserted into the upper tube (30, 31) and the middle tube (32), the upper tube (30, 31) and the middle tube (32) are still able to be slidably received in the middle tube (32) and the lower tube (33) respectively.

Figure 4:
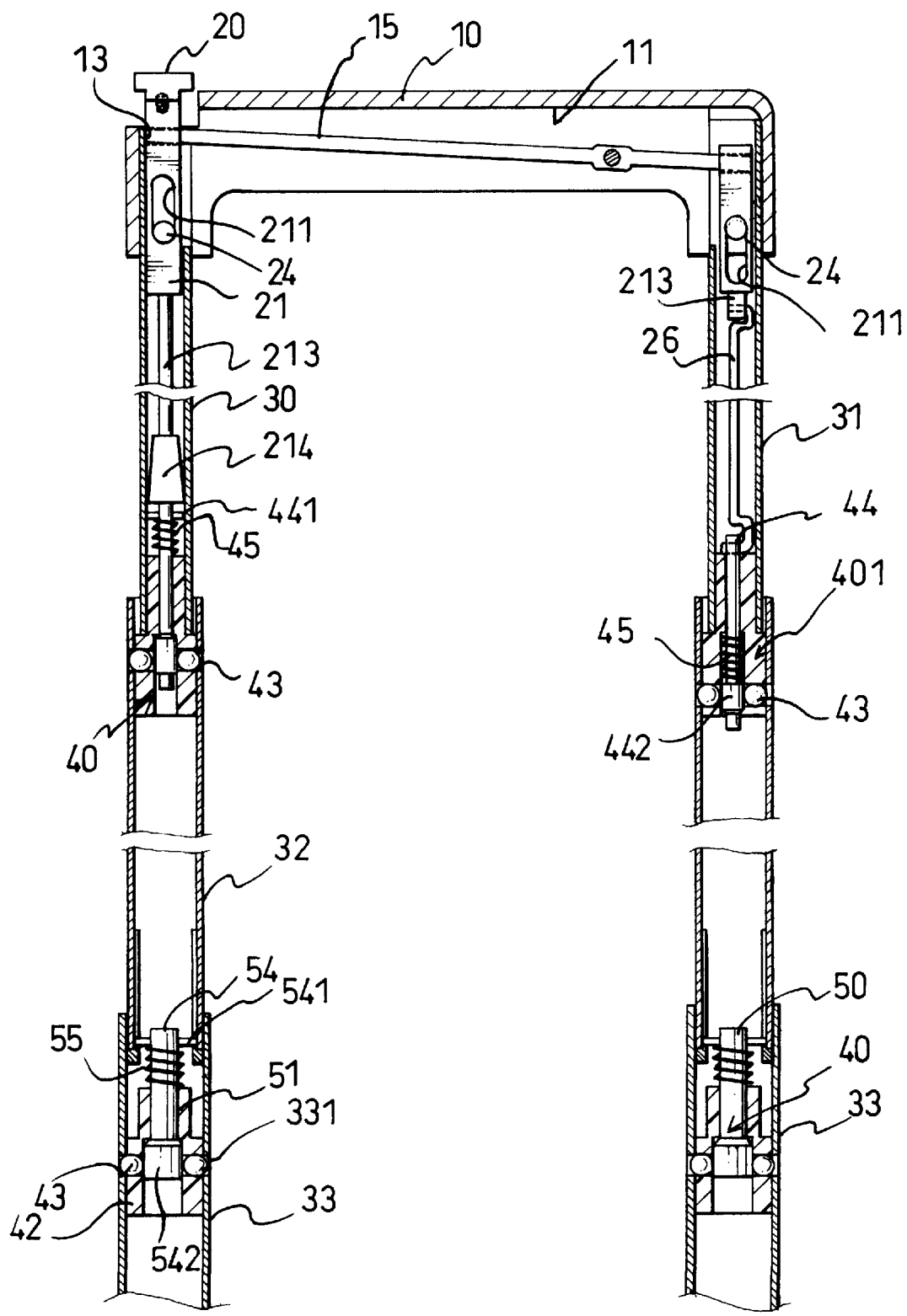
FIG. 4 is a cross sectional view of the present invention, showing the pull-tubes fully extended.

Furthermore, referring to FIGS. 1 and 4, the rod (44, 54) has an annular portion (442,542) integrally and peripherally formed therewith so as that the diameter of the portion where the rod (44, 54) having the annular portion (442, 542) formed therewith is larger than the diameter of the rod (44, 54). Therefore, the rods (44, 54) of the first and second driven blocks (40, 50) can only extend out therefrom partially and the coil springs (45, 55) are mounted on the extended portion of the rods (44, 54) respectively.

Before assembly, the first portions (41, 51) of the first driven block (40) and the second driven block (50) are respectively inserted into one end of the upper tube (30, 31) and the middle tube (32). Therefore, the upper tube (30, 31) is inserted into the middle tube (32) from the end where there is no inner padding (320) and the middle tube (32) together with the upper tube (30, 31) slidably received therein is inserted into the lower tube (33) from the end where there is no inner padding (330). Thereafter, the lever (25) is pivotally mounted in the internal chamber (11) via the pivot hole (12) of the handle (10) and both ends of the lever (25) are respectively inserted into the opening (212) of the linkage (21). Then, the button (20) is securely connected with one of the linkages (21), preferably by screw as shown. Whereby, the button (20) is placed on top of the aperture (13) and the linkages (21) either connected with the button (20) or the one which is not connected with the button (20) are movably received in the internal chamber (11). Then a pin (24) extends through a face of the handle (10) and into the slot (211) of the linkage (21), such that the button (20) together with the linkage (21) is able to move in the aperture (13) and the lever (25) is able to be moved in the slot (211) of the linkage (21).

As shown in FIG. 1 the right portion of the operating device has a hook (26), a first end of which is connected to the extension (213) of the linkage (21) and a second end of which extends into the first portion (41) of the first driven block (40) and is securely connected therewith.

Referring to FIGS. 1, 2 and 3, when the operating device for the telescopic handle of a luggage cart is assembled, the pair of balls (43, 53) are first received in corresponding holes (421, 521) defined in the second portions (42, 52) of the respective first driven block (40) and the second driven block (50) by the annular portion (442, 542) thereof. To hold the upper, the middle and the lower tubes (30, 31, 32, 33) in position when folded, the middle tube (32) and the lower tube (33) have a pair of openings (321, 331) defined to correspond to and receive the pair of balls (43, 53) therein respectively. Due to the pivotal movement of the lever (25) in the internal chamber (11) of the transverse bar (10), the orientation of the left portion of the drawing is different from that of the right portion, which means that the downward movement of the left portion will cause an upward movement to the right portion.

Referring to FIG. 4, the balls (43) of the first driven block (40) protrude out from the second portion (42) and are received in the corresponding opening (321) in the middle tube (32), and the balls (53) of the second driven block (50) protrude out from the second portion (52) and are received in the corresponding opening (331) in the lower tube (33), such that the upper tube (30, 31), the middle (32) and the lower tube (33) are able to be held in position when the tubes are fully extended.

Figure 5:
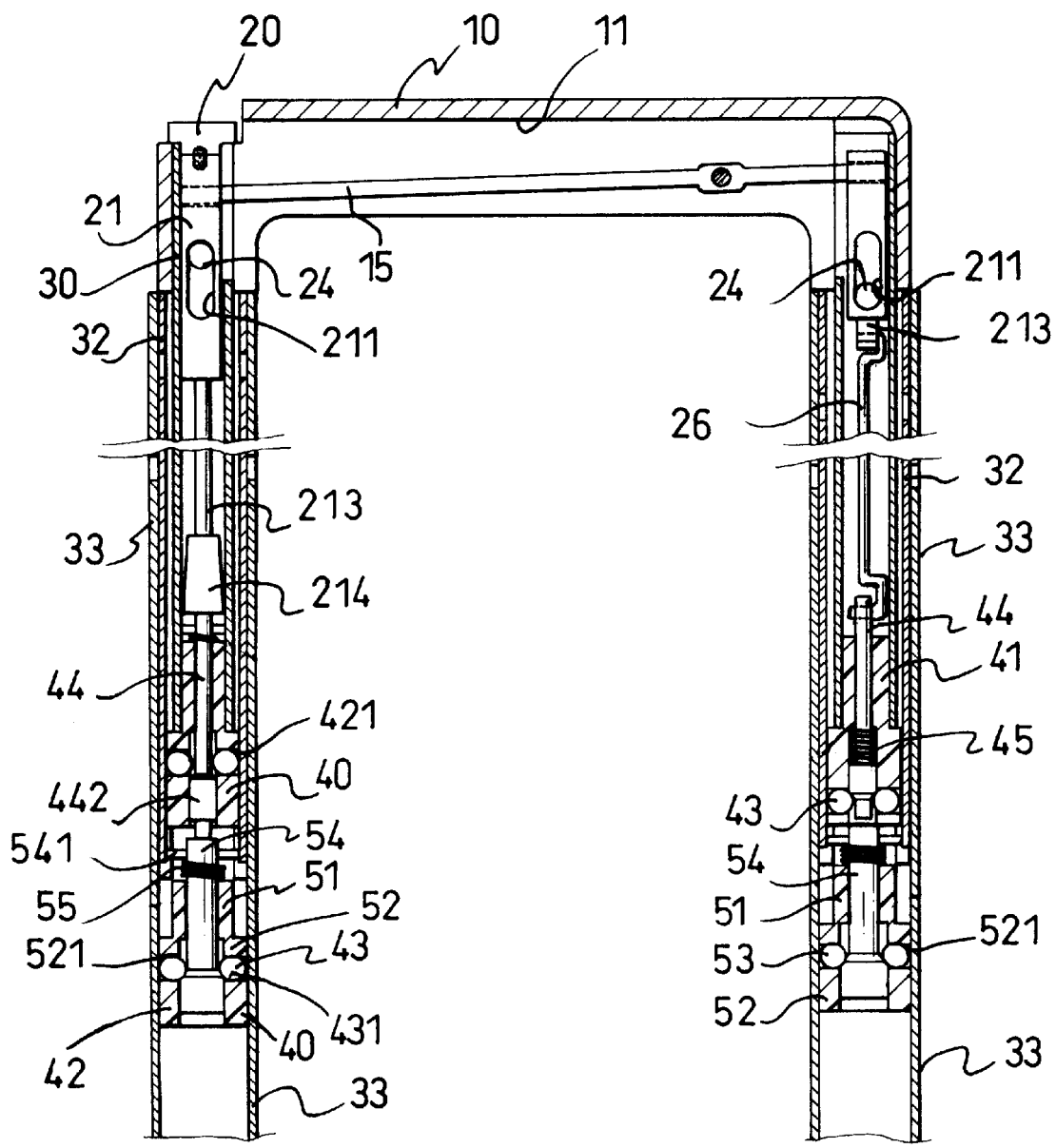
FIG. 5 is a cross sectional view of the present invention; showing the pull-tubes fully returned.

Referring to FIG. 5, when the button (20) is pressed downward, the downward movement of the linkage (20) will initiate a corresponding downward movement to the rod (44). The movement of the rod (44) will cause the balls (43) to be received in opposite sides of the first portion (41) of the first driven block (40), such that the upper tube (30) is able to be received in the middle tube (32). When the upper tube (30) is received in the middle tube (32) and the user keeps on pressing the button (20), the bottom of the rod (44) will contact the upper face of the rod (54) and accordingly apply a downward force thereto. The balls (53) initially received in the corresponding openings (331) of the lower tube (33) will be forced to be received in opposite sides of the first portion (51), such that the middle tube (32) is able to be received in the lower tube (33).

While the user is pressing the button (20) downward, the end of the lever (25) will be moved in an upward direction, which will initiate the first driven block (40) to have a corresponding upward movement due to the hook (26). The balls (43) will be forced to be received in the stepped portion (443) formed immediately under the annular portion (442), such that the upper tube (31) can be received in the middle tube (32). If the user continues the downward movement of the transverse bar (10), the bottom of the rod (44) engages the top of the rod (54) to force the balls (53) to be received in the corresponding openings (521) in the second portion (52) of the second driven block (50).

From the description above, the operating device of the invention for a telescopic handle of a luggage cart enables the user to extend and fold the tubes with one hand. The pivotal movement of the lever (25) causes a reverse operation to both sides of the transverse bar (10), which eliminates the drawbacks of nonsynchronous and complex procedures to extend or fold the tubes.

The present invention has following advantages:

1. The control button of the operating device is provided at one side of the handle and apart from the handle portion. People will easily operate the button when needed without inadvertently pressing the button.

2. The operating device synchronously controls both sides of handle.

3. The parts of the operating device are simple and the cost of fabrication is lower when compared to the conventional one.

What is claimed is:

1. A operating device for a telescopic handle symmetrically having a transverse bar (10) defining therein an internal chamber (11), a pair of lower tubes (33) each defining therein a pair of first openings (331) and having an inner padding (330) formed in one end thereof, a pair of middle tubes (32) each slidably received in the lower tube (33) and having a pair of second openings (321) defined therein and an inner padding (320) formed in one end thereof and a pair of upper tubes (30,31) each slidably received in the middle tube (32) and having a cutout defined therein, the operating device comprising:

a button (20) movably mounted on top of the transverse bar (10), a pair of linkages (21) one of which is securely connected to the button (20) within the internal chamber (11) of the transverse bar (10) and each having a slot (211) longitudinally defined therein, an opening (212), an extension (213) extended downward therefrom;

a lever (25) pivotally received in the internal chamber (11) and connected between the pair of linkages (21) via the openings (212);

a pair of first driven blocks (40) each having a first portion (41) securely inserted into one end of the upper tube (30, 31), a hollow second portion (42) larger in size than the first portion (41) integrally formed with the first portion (41), a pair of balls (43) received in the second portion (42) and correspondingly and movably received in the pair of second openings (321) of the middle tube (32), a rod (44) longitudinally and movably received therein, a coil spring (45) mounted around the rod (44) and a stop (441) inserted through the rod (44) to hold the coil spring (45) in position between the first portion (41) and the stop (441);

wherein one of the rods (44) is detachably connected with the extension (213) of one of the linkages (21) and the other one of the rods (44) is securely connected with the extension (213) of the other linkage (21); and a pair of second driven blocks (50) each having a first portion (51) securely received in one end of the middle tube (32) and a second portion (52) larger in size than the first portion (51) integrally formed with the first portion (51), a pair of balls (53) received in the second portion (52) and movably and correspondingly received in the pair of the first openings (331), a rod (54) longitudinally and movably received therein and being detachably connected with a bottom of the rod (44), a coil spring (55) mounted around the rod (54) and a stop (541) inserted through the rod (54) to hold the coil spring (55) in position between the first portion (51) and the stop (541).

2. The operating device as claimed in claim 1, wherein a cone (214) is integrally formed on a free end of the extension (213) of one of the pair of linkages (21) to be detachably connected with the rod (44).

3. The operating device as claimed in claim 2, wherein a hook (26) is provided to securely connect the extension (213) of the other linkage (21) and the first portion (41) of the first driven block (40).

4. The operating device as claimed in claim 1, wherein a pair of pins (24) are respectively inserted through the transverse bar (10) and into the slots (211) of each one of the pair of linkages (21) so as to be movably received therein.

5. The operating device as claimed in claim 4, wherein each of the pins (24) moves in a reversed orientation with respect to each other.

* * * * *